United States Patent
Cheng

(10) Patent No.: US 6,592,267 B1
(45) Date of Patent: Jul. 15, 2003

(54) OPTICAL FIBER PLUG

(76) Inventor: Yu-Feng Cheng, No. 7, Fuhsing St., Tucheng Ind. Dist., Tucheng City, Taipei Hsien (TW)

( * ) Notice: Subject to any disclaimer, the term of this patent is extended or adjusted under 35 U.S.C. 154(b) by 0 days.

(21) Appl. No.: 10/043,314

(22) Filed: Jan. 14, 2002

(51) Int. Cl.$^7$ .................................................. G02B 6/36
(52) U.S. Cl. ............................. 385/81; 385/83; 385/62; 385/78
(58) Field of Search .............................. 385/81, 78, 60, 385/62, 76, 77, 83, 84, 55

(56) References Cited

U.S. PATENT DOCUMENTS

| | | | | |
|---|---|---|---|---|
| 4,762,389 A | * | 8/1988 | Kaihara | 385/60 |
| 5,231,685 A | * | 7/1993 | Hanzawa et al. | 385/84 |
| 5,590,230 A | * | 12/1996 | Cheng | 385/77 |

* cited by examiner

*Primary Examiner*—Phan T. H. Palmer
(74) *Attorney, Agent, or Firm*—Troxell Law Office PLLC

(57) ABSTRACT

An optical fiber plug includes a body having a channel defined through the body, at least one set of recesses oppositely defined in a face of the body, and a clamping portion formed between the channel and a bottom face defining each of the at least one set of recesses. The deformation of the clamping portion is able to retain an insulating layer of an optical fiber.

3 Claims, 6 Drawing Sheets

OPTICAL FIBER PLUG

BACKGROUND OF THE INVENTION

1. Field of the Invention

The present invention relates to an optical fiber plug, and more particularly to an optical fiber plug having at least one set of recesses oppositely defined in a periphery of the body of the optical fiber plug so that the insulating layer of the optical fiber is able to be retained in the plug after the optical fiber is inserted into the optical fiber plug.

2. Description of Related Art

With reference to FIG. 16, a conventional optical fiber plug (70) has a body (71), a channel (711) longitudinally defined through the body (71), a through hole (72) axially defined through a periphery of the body (71) to communicate with the channel (711) and a clamping plate (73) detachably inserted into the through hole (72) and having a hole (731) defined through the clamping plate (73) to correspond to the channel (711).

An optical fiber (80) to be inserted into the optical fiber plug (70) has a filament (81) and an insulating layer (82) surrounding the filament (81).

Before the optical fiber (80) is inserted into the optical fiber plug (70), the clamping plate (73) is first inserted into the through hole (72) to allow a communication between the channel (711) and the hole (731). Thereafter, the optical fiber (80) is inserted into the channel (711) and through the hole (731). It is to be noted that the hole (731) has a diameter slightly larger than that of the insulating layer (82) so that after the insulating layer (82) is inserted into the hole (731), the user is able to use a tool (not shown) to deform the clamping plate (73), which deforms the hole (731) and thus the insulating layer (82) is retained relative to the optical fiber plug (70).

This kind of optical fiber plug (70) does have the effect to retain the optical fiber (80). However, it needs manual effort to align the hole (731) and the channel (711) and extra work to define the through hole (72) in the periphery of the body (71). The fabrication cost is high and the subsequent assembly is labor inefficient.

To overcome the shortcomings, the present invention tends to provide an improved optical fiber plug to mitigate and obviate the aforementioned problems.

SUMMARY OF THE INVENTION

The primary objective of the present invention is to provide an optical fiber plug having at least one set of recesses defined in a periphery of the body of the optical fiber plug so that the optical fiber can be retained in the optical fiber plug by the deformation of a bottom face defining the at least one set of recesses.

Other objects, advantages and novel features of the invention will become more apparent from the following detailed description when taken in conjunction with the accompanying drawings.

DETAILED DESCRIPTION OF THE PREFERRED EMBODIMENT

Figure 1:
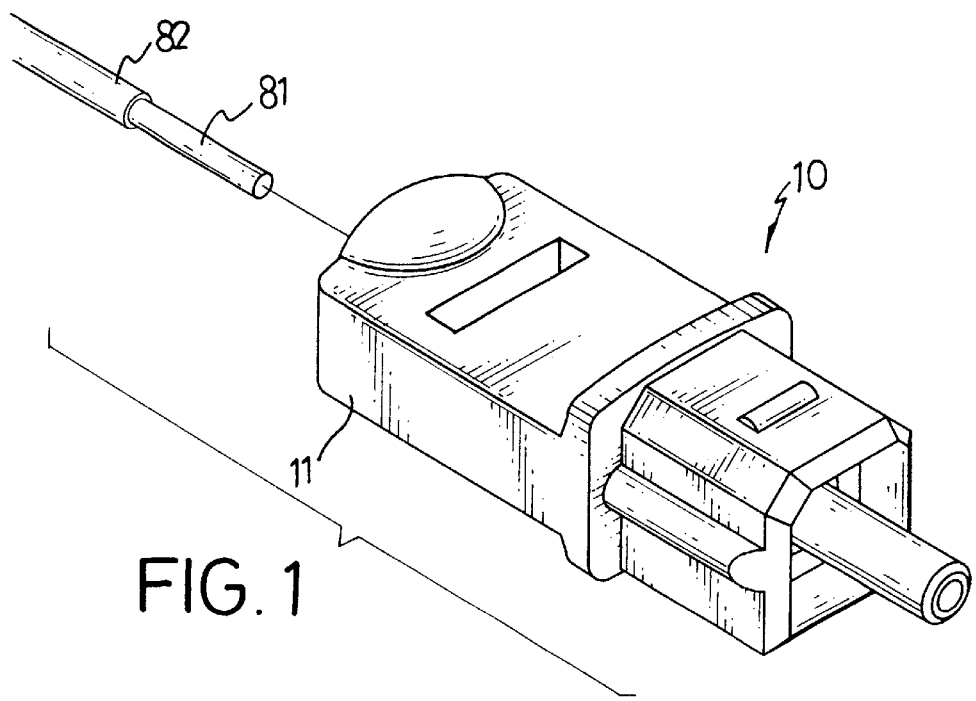
FIG. 1 is a perspective view of a first preferred embodiment of the present invention.
Figure 2:
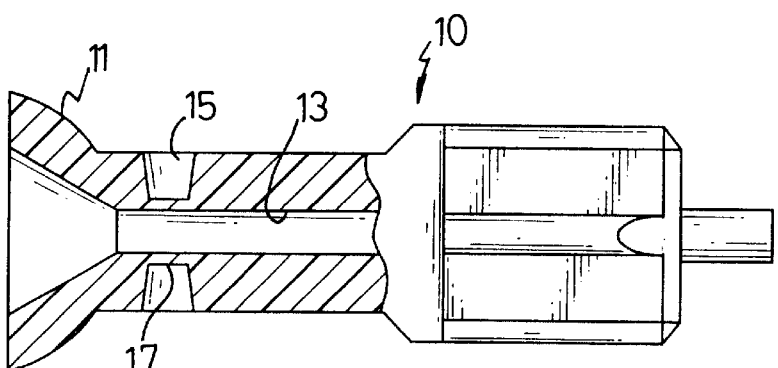
FIG. 2 is a side plan view with partial in section of the optical fiber plug in FIG. 1.

With reference to FIGS. 1 and 2, the optical fiber plug (10) has a body (11), a channel (13) longitudinally defined through the body (11), at least one set of recesses (15) oppositely defined in a periphery of the body (11) and a clamping portion (17) formed between the channel (13) and a bottom face defining each of the at least one set of recesses (15).

Figure 3:
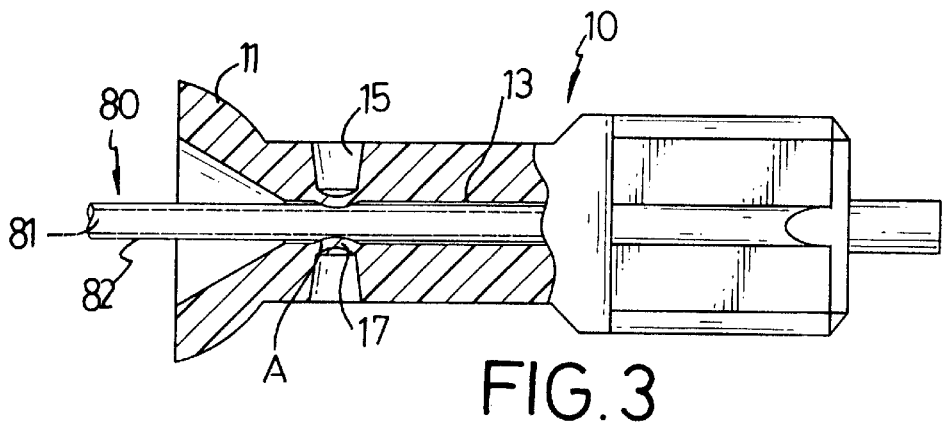
FIG. 3 is a schematic view showing an optical fiber is inserted into the optical fiber plug in FIG. 1 and retained by the deformation of the faces defining the recesses.

When the optical fiber (80) is inserted into the channel (13), as shown in FIG. 3, the user is able to use a tool to directly deform the clamping portion (17) and thus the insulating layer (82) is clamped by the deformation of the clamping portion (17). The deformation degree (A) of the clamping portion (17) can be determined by the tool with a gauge whereby as long as the insulating layer (82) is small enough to pass through the channel (13) and, in the meantime, big enough not to let the clamping portion (17) to have over deformation. Because the tool with a measuring gauge looks very much like a pair of wrench and is well known in the art, the operation and detailed structure of the tool is omitted in the detailed description.

Figure 4:
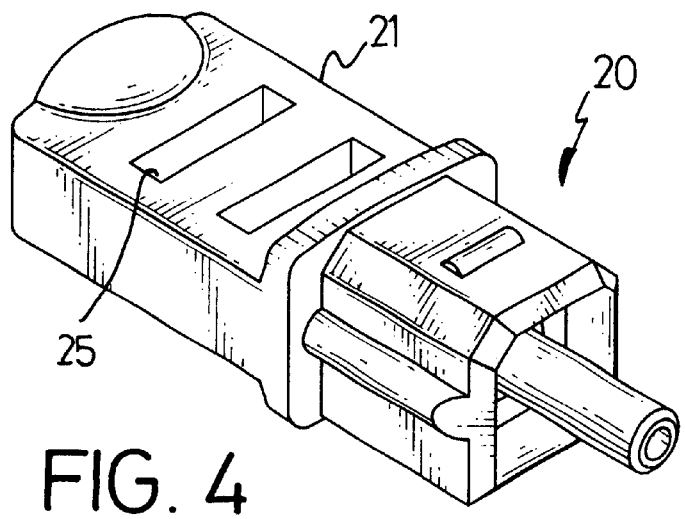
FIG. 4 is a perspective view of a second preferred embodiment of the present invention.
Figure 5:
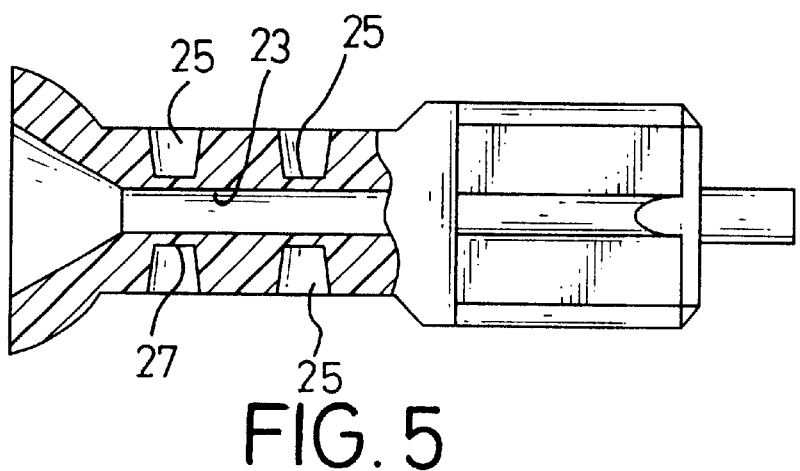
FIG. 5 is aside plan view with partial in section of the optical fiber plug in FIG. 4.

With reference to FIGS. 4 and 5, the second preferred embodiment of the optical fiber plug (20) of the present invention has a body (21), a channel (23) longitudinally defined through the body (21), two sets of recesses (25) oppositely defined in a periphery of the body (21) and a clamping portion (27) formed between the channel (23) and a bottom face defining each of the two sets of recesses (25).

Figure 6:
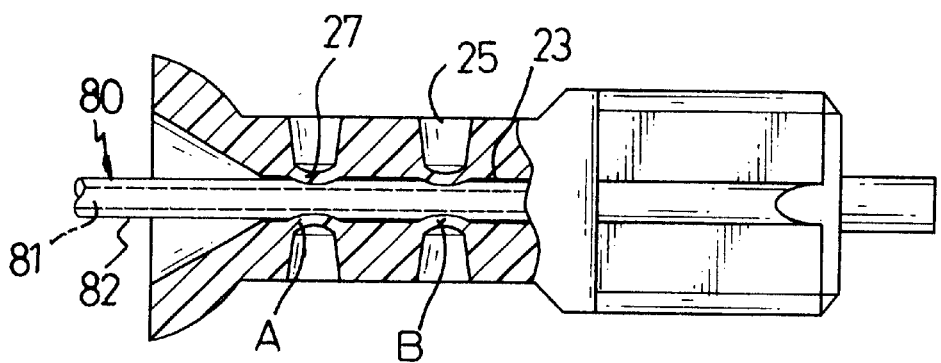
FIG. 6 is a schematic view showing an optical fiber is inserted into the optical fiber plug in FIG. 4 and retained by the deformation of the faces defining the recesses.

With reference to FIG. 6, when the optical fiber (80) is inserted into the channel (23), the user is able to use a tool to directly deform the clamping portions (27) and thus the insulating layer (82) is clamped by the deformation of the clamping portion (27). The deformation degrees (A,B) of the clamping portions (27) can be determined by the tool with a gauge whereby as long as the insulating layer (82) is able to pass through the channel (23), the diameter of the insulating layer (82) is not a problem to the user.

Figure 7:
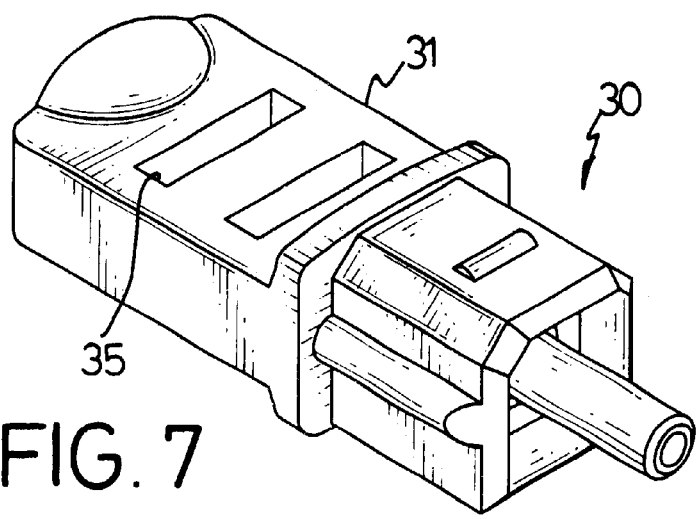
FIG. 7 is a perspective view of a third preferred embodiment of the present invention.
Figure 8:
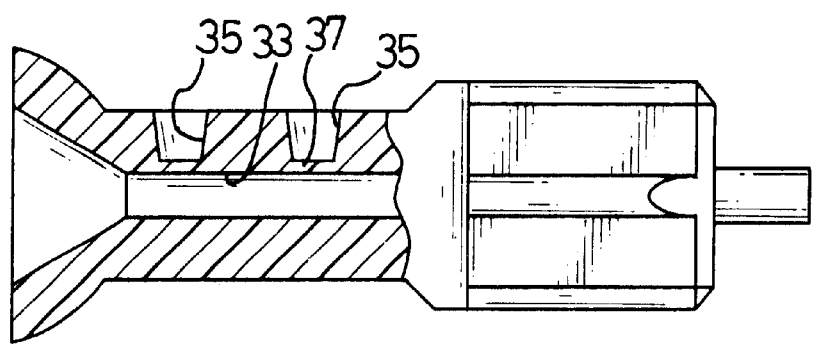
FIG. 8 is a side plan view with partial in section of the optical fiber plug in FIG. 7.

With reference to FIGS. 7 and 8, another preferred embodiment of the optical fiber plug (30) of the present invention has a body (31), a channel (33) longitudinally defined through the body (31), two sets of recesses (35) horizontally defined in the same periphery of the body (31) and a clamping portion (37) formed between the channel (33) and a bottom face defining each of the two sets of recesses (35).

Figure 9:
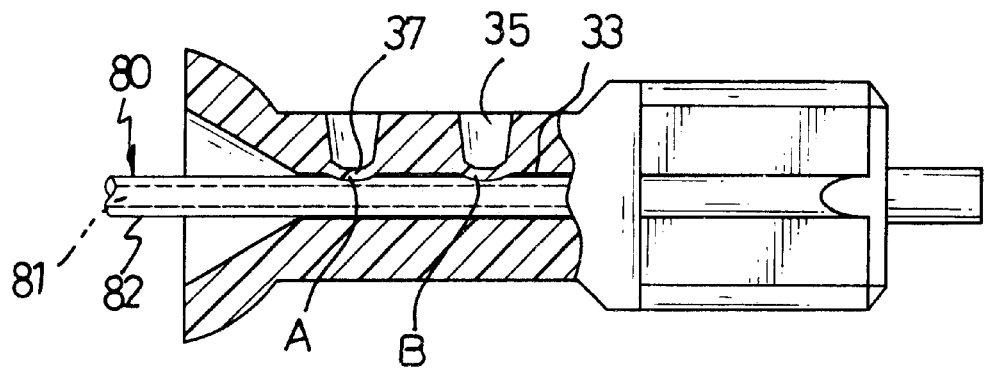
FIG. 9 is a schematic view showing an optical fiber is inserted into the optical fiber plug in FIG. 7 and retained by the deformation of the faces defining the recesses.
Figure 10:
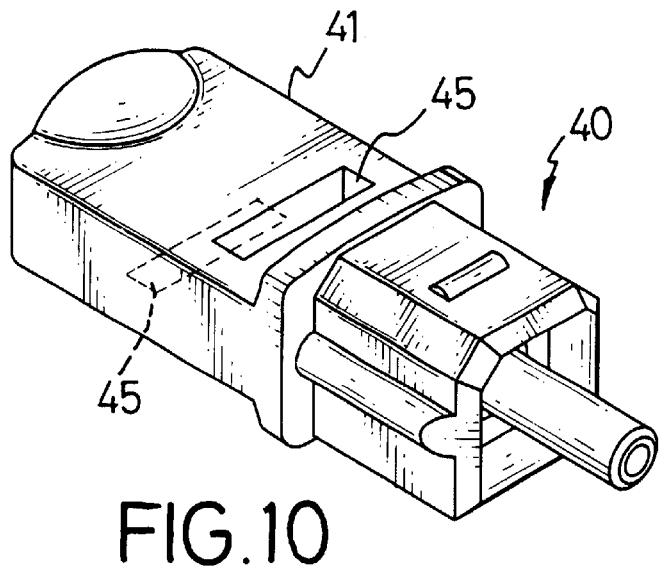
FIG. 10 is a perspective view of a fourth preferred embodiment of the present invention.
Figure 11:
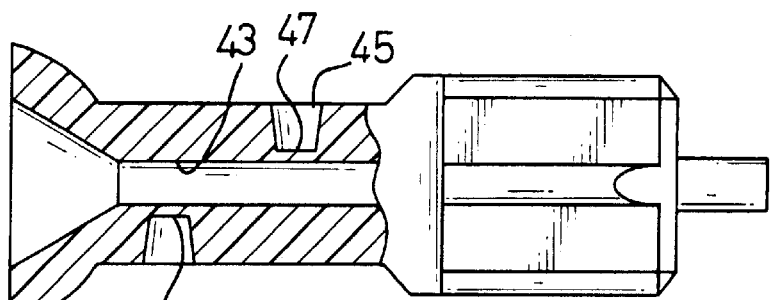
FIG. 11 is a side plan view with partial in section of the optical fiber plug in FIG. 10.

With reference to FIG. 9, when the optical fiber (80) is inserted into the channel (33), the user is able to use a tool to directly deform the clamping portions (37) and thus the insulating layer (82) is clamped by the deformation of the clamping portion (37). The deformation degrees (A,B) of the clamping portions (37) can be determined by the tool with a gauge whereby as long as the insulating layer (82) is able to pass through the channel (33), the diameter of the insulating layer (82) is not a problem to the user. With reference to FIGS. 10 and 11, still another preferred embodiment of the optical fiber plug (40) of the present invention has a body (41), a channel (43) longitudinally defined through the body (41), two sets of recesses (45) oppositely defined in a periphery of the body (41) and a clamping portion (47) formed between the channel (43) and a bottom face defining each of the two sets of recesses (45).

Figure 12:
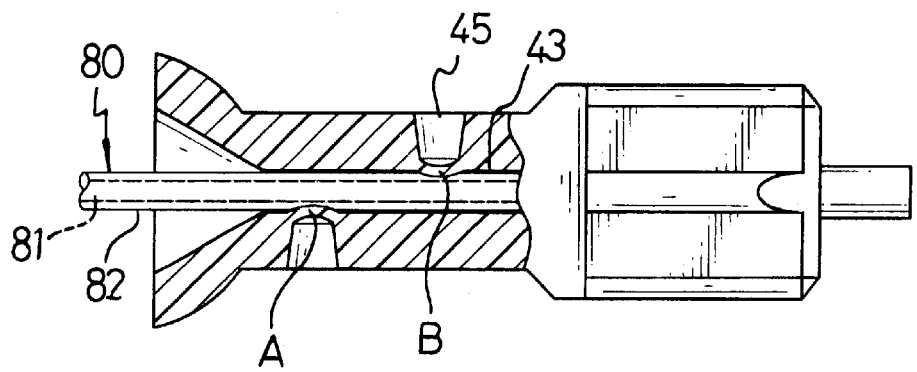
FIG. 12 is a schematic view showing an optical fiber is inserted into the optical fiber plug in FIG. 10 and retained by the deformation of the faces defining the recesses.

With reference to FIG. 12, when the optical fiber (80) is inserted into the channel (23), the user is able to use a tool to directly deform the clamping portions (27) and thus the insulating layer (82) is clamped by the deformation of the clamping portion (27). The deformation degrees (A,B) of the clamping portions (27) can be determined by the tool with a gauge whereby as long as the insulating layer (82) is able to pass through the channel (23), the diameter of the insulating layer (82) is not a problem to the user.

Figure 13:
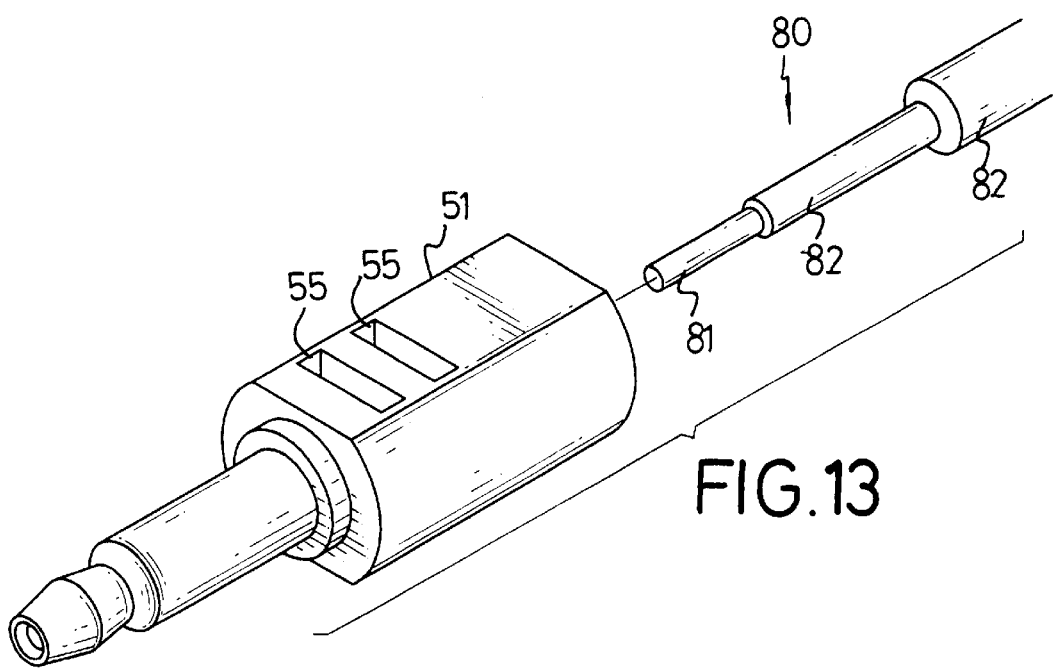
FIG. 13 is a perspective view of a fifth preferred embodiment of the present invention.
Figure 14:
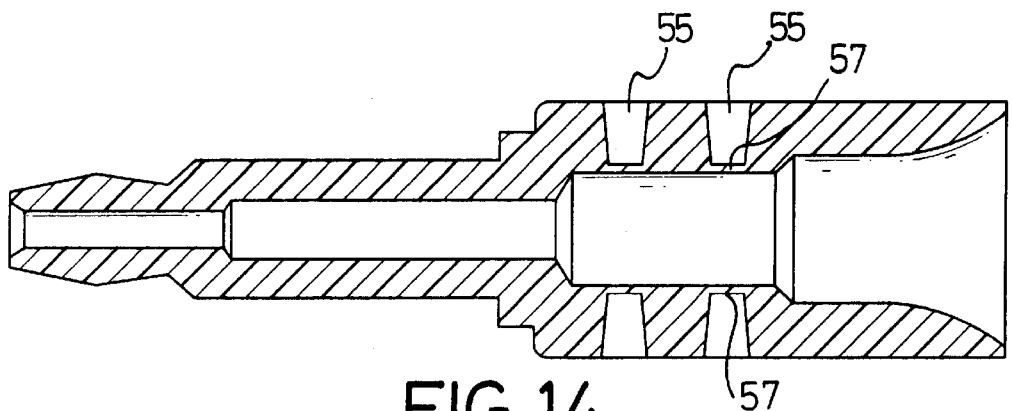
FIG. 14 is a side plan view with partial in section of the optical fiber plug in FIG. 13.
Figure 15:
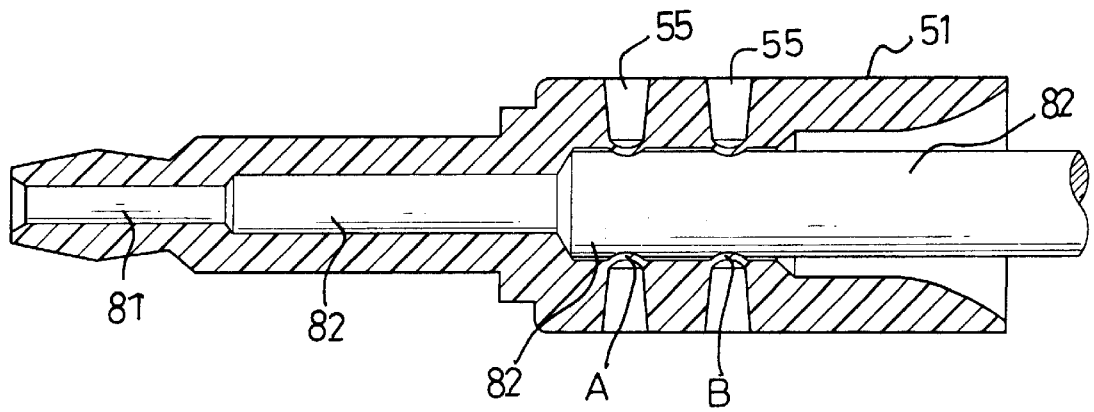
FIG. 15 is a schematic view showing an optical fiber is inserted into the optical fiber plug in FIG. 13 and retained by the deformation of the faces defining the recesses.
Figure 16:
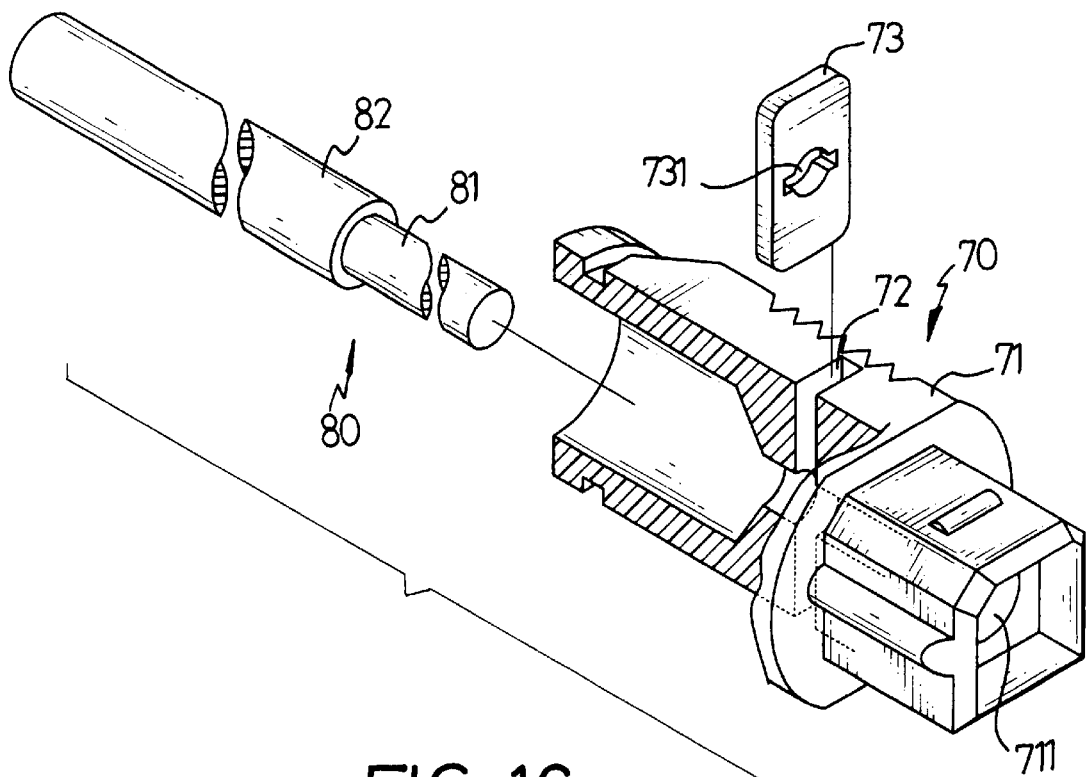
FIG. 16 is a perspective view of a conventional optical fiber plug with partial in section, wherein an optical fiber is presented for description purpose.

With reference to FIGS. 13, 14 and 15, still another preferred embodiment of the optical fiber plug of the present utility model has a body (51), a channel (not numbered) longitudinally defined through the body (51), two sets of recesses (55) oppositely defined in a periphery of the body (51) and a clamping portion (57) formed between the channel and a bottom face defining each of the two sets of recesses (55).

According to the foregoing description, it is noted that the optical fiber plug of the present invention requires no extra work to manufacture the clamping plate and no extra work to align the channel with the hole in the clamping plate, such that the manufacture cost is low and labor requirement is maintained minimum.

It is to be understood, however, that even though numerous characteristics and advantages of the present invention have been set forth in the foregoing description, together with details of the structure and function of the invention, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:

1. An optical fiber plug for an optical fiber, the optical fiber plug comprising:

a body having a channel defined through the body;

at least one set of recesses defined in a face of the body; and a clamping portion formed between the channel and a bottom face defining each of the at least one set of recesses;

whereby the clamping portion is able to deform so as to retain an insulating layer of the optical fiber.

2. The optical fiber plug as claimed in claim 1, wherein the at least one set of recesses are horizontally defined in the face of the body.

3. The optical fiber plug as claimed in claim 1, wherein the at least one set of recesses are oppositely defined in the face of the body.

* * * * *